(12) United States Patent
Moore (10) Patent No.: US 9,069,755 B2
(45) Date of Patent: Jun. 30, 2015

(54) N-GRAM MODEL SMOOTHING WITH INDEPENDENTLY CONTROLLABLE PARAMETERS

(75) Inventor: Robert Carter Moore, Mercer Island, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 776 days.

(21) Appl. No.: 12/721,578

(22) Filed: Mar. 11, 2010

(65) Prior Publication Data

US 2011/0224983 A1    Sep. 15, 2011

(51) Int. Cl.
  G06F 17/27    (2006.01)
  G06F 17/28    (2006.01)
  G10L 15/00    (2013.01)
  G10L 15/18    (2013.01)
  G10L 15/197   (2013.01)

(52) U.S. Cl.
  CPC ........ *G06F 17/2775* (2013.01); *G06F 17/2715* (2013.01); *G06F 17/2881* (2013.01); *G10L 15/197* (2013.01)

(58) Field of Classification Search
  USPC .......................................... 704/236, 240, 257
  See application file for complete search history.

(56) References Cited

U.S. PATENT DOCUMENTS

| | | | |
|---|---|---|---|
| 5,765,133 A * | 6/1998 | Antoniol et al. ............. 704/255 |
| 6,154,722 A | 11/2000 | Bellegarda | |
| 6,606,597 B1 | 8/2003 | Ringger et al. | |
| 6,782,357 B1 * | 8/2004 | Goodman et al. ............. 704/9 |
| 7,103,534 B2 * | 9/2006 | Goodman ..................... 704/9 |
| 7,206,736 B2 | 4/2007 | Moore | |
| 7,526,424 B2 | 4/2009 | Corston-Oliver et al. | |
| 7,774,197 B1 * | 8/2010 | Bulyko ........................ 704/9 |
| 7,877,258 B1 * | 1/2011 | Chelba et al. ............... 704/257 |
| 8,898,052 B2 * | 11/2014 | Waibel et al. ................ 704/9 |
| 2004/0138884 A1 * | 7/2004 | Whittaker et al. ........... 704/236 |
| 2005/0055199 A1 * | 3/2005 | Ryzchachkin et al. ........ 704/4 |
| 2005/0228640 A1 * | 10/2005 | Aue et al. .................... 704/9 |
| 2006/0053015 A1 * | 3/2006 | Lai et al. ..................... 704/257 |
| 2007/0078653 A1 * | 4/2007 | Olsen .......................... 704/240 |
| 2007/0271088 A1 * | 11/2007 | Waibel et al. ................ 704/9 |
| 2008/0255844 A1 * | 10/2008 | Wu ............................... 704/255 |
| 2009/0099841 A1 * | 4/2009 | Chen ............................ 704/9 |
| 2012/0223889 A1 * | 9/2012 | Medlock et al. ............. 345/168 |

OTHER PUBLICATIONS

Chen et al, "A gaussian prior for smoothing maximum entropy models", 1999, Technical Report CMU-CS-99-108, Computer Science Department, Carnegie Mellon University, pp. 1-28.*

(Continued)

*Primary Examiner* — Olujimi Adesanya
(74) *Attorney, Agent, or Firm* — Sandy Swain; Peter Taylor; Micky Minhas (57) ABSTRACT

Described is a technology by which a probability is estimated for a token in a sequence of tokens based upon a number of zero or more times (actual counts) that the sequence was observed in training data. The token may be a word in a word sequence, and the estimated probability may be used in a statistical language model. A discount parameter is set independently of interpolation parameters. If the sequence was observed at least once in the training data, a discount probability and an interpolation probability are computed and summed to provide the estimated probability. If the sequence was not observed, the probability is estimated by computing a backoff probability. Also described are various ways to obtain the discount parameter and interpolation parameters.

20 Claims, 3 Drawing Sheets

(56) References Cited

OTHER PUBLICATIONS

Whittaker et al, "Quantization-based Language Model Compression", 2001, In Proc. of Eurospeech, pp. 33-36.*

Hsu et al, "Iterative language model estimation:efficient data structure & algorithms", 2008, in Proceedings of Interspeech, pp. 1-4.*

James, "Modified Kneser-Ney Smoothing of n-gram Models", 200, Technical Report TR00-07, RIACS, USRA, 2000.*

Xu et al, "Using Random Forests in the Structured Language Model", Dec. 2004, In proceeding of: Advances in Neural Information Processing Systems NIPS 2004, pp. 1-8.*

Siivola et al, "On growing and pruning Kneser-Ney smoothed n-gram models,", Jul. 2007, IEEE Trans. Audio, Speech Lang. Process., vol. 15, No. 5, pp. 1617-1624.*

Huang, et al., "Smoothing N-Gram Language Models", Retrieved at <<http://www.isip.piconepress.com/publications/courses/ece_8463/lectures/current/lecture_33/lecture_33.pdf>>, 2001, pp. 11.

Yuret, Deniz, "Smoothing a Tera-Word Language Model", Retrieved at <<http://www.aclweb.org/anthology/P/P08/P08-2036.pdf>>, Proceedings of the 46th Annual Meeting of the Association for Computational Linguistics on Human Language Technologies: Short Papers, Jun. 16-17, 2008, pp. 141-144.

Rosenfeld, Roni, "Statistical Language Modeling and N-grams", Retrieved at <<http://www.cs.cmu.edu/afs/cs/academic/class/11761-s97/WWW/tex/Ngrams.ps>>, Jan. 1997, pp. 1-12.

Katz, Slava M., "Estimation of Probabilities from Sparse Data for the Language Model Component of a Speech Recognizer", Retrieved at <<http://ieeexplore.ieee.org/stamp/stamp.jsp?tp=&arnumber=1165125&isnumber=26208>>, IEEE Transactions on Acoustics, Speech and Signal Processing, vol. ASSP-35, No. 3, Mar. 1987, pp. 400-401.

Yuret, Deniz, "SRILM Ngram Smoothing Notes", Retrieved at <<http://denizyuret.blogspot.com/2007/12/srilm-ngram-smoothing-notes.html>>, Deniz Yuret's Homepage, Dec. 31, 2007, pp. 1-9.

Zhou, et al., "A Statistical Language Modeling Approach to Online Deception Detection", Retrieved at <<http://ieeexplore.ieee.org/stamp/stamp.jsp?arnumber=04358936>>, IEEE Transactions on Knowledge and Data Engineering, vol. 20, No. 8, Aug. 2008, pp. 1077-1081.

"Estimating the Query Generation Probability", Retrieved at <<http://nlp.stanford.edu/IR-book/html/htmledition/estimating-the-query-generation-probability-1.html>>, Cambridge University Press, 2008, pp. 1-3.

Goldwater, et al., "Interpolating between Types and Tokens by Estimating Power-Law Generators", Retrieved at <<http://cocosci.berkeley.edu/tom/papers/typetoken.pdf>>, In Advances in Neural Information Processing Systems 18, 2006, pp. 8.

Chen, et al., "An Empirical Study of Smoothing Techniques for Language Modeling", Retrieved at <<http://research.microsoft.com/en-us/um/people/joshuago/tr-10-98.pdf>>, Computer Science Group, Harvard University, Aug. 1998, pp. 1-63.

Kneser, et al., "Improved Backing-off for M-Gram Language Modeling", Retrieved at <<http://ieeexplore.ieee.org/stamp/stamp.jsp?tp=&arnumber=479394&isnumber=10215>>, IEEE ICASSP 95, May 1995, pp. 181-184.

Koehn, et al."Manual and Automatic Evaluation of Machine Translation between European Languages", Retrieved at <<http://www.mt-archive.info/HLT-NAACL-2006-Koehn.pdf>>, Proceedings of the Workshop on Statistical Machine Translation, Jun. 8-9, 2006pp. 102-121.

Murveit, et al., "Progressive Search Algorithms for Large-Vocabulary Speech Recognition", Retrieved at <<http://www.aclweb.org/anthology/H/H93/H93-1017.pdf>>, Proceedings of the workshop on Human Language Technology, Mar. 21-24, 1993, pp. 87-90.

Nguyen, et al., "MSRLM: A Scalable Language Modeling Toolkit", Retrieved at <<http://research.microsoft.com/pubs/70505/tr-2007-144.pdf>>, Microsoft Research Publications, Nov. 2007, pp. 19.

Petrov, et al., "Coarse-to-Fine Syntactic Machine Translation using Language Projections", Retrieved at <<http://www.eecs.berkeley.edu/~petrov/data/emnlp08b.pdf>>, Proceedings of the Conference on Empirical Methods in Natural Language Processing, Oct. 25-27, 2008, pp. 9.

\* cited by examiner

N-GRAM MODEL SMOOTHING WITH INDEPENDENTLY CONTROLLABLE PARAMETERS

BACKGROUND

Statistical language models (SLMs) estimate the probability of a text string as a string of natural language, and thus may be used with applications that output natural language text. For example, systems such as speech recognizers or machine translation systems generate alternative text outputs, and those outputs may be processed by statistical language models to compute probability values indicating which of them are the most natural. The more natural and human-like the piece of text is, the higher the probability that the statistical language model should assign to it.

The most widely used types of statistical language models are N-gram models, which estimate the probability of each word in a text string based on the N−1 preceding words of context. For example, the maximum likelihood estimate (MLE) N-gram model determines the probability of a word in a given context of N−1 preceding words as the ratio, in a training corpus, of the number of occurrences of that word in that context to the total number of occurrences of any word in the same context. However, this assigns a probability of zero to any N-gram that is not observed in the training corpus, and thus works poorly whenever an N-gram that was not observed in training is fed to the statistical language models in actual usage.

In order to overcome this problem, numerous smoothing methods have been employed. In general, these methods reduce the probabilities assigned to some or all observed N-grams, in order to provide non-zero probabilities for N-grams not observed in the training corpus.

Kneser-Ney smoothing and its variants, well-known in the art, are generally recognized as the most effective smoothing methods for estimating N-gram language models. For example, Kneser-Ney smoothing and its variants provide very high quality results as measured by evaluating how well such models assign higher probabilities to randomly-selected human-generated text versus the probabilities assigned to mechanically-generated or randomly-generated text.

Smoothing methods operate by using a hierarchy of lower-order models (e.g., unigram, then bigram and so on) to smooth the highest-order N-gram model. In most smoothing methods, the lower-order N-gram models are recursively estimated in the same way as the highest-order model. However, in Kneser-Ney smoothing the lower-order models are estimated differently from the highest-order model. More particularly, Kneser-Ney smoothing is based upon using nonstandard N-gram (diversity) counts for the lower-order models.

As a result of these nonstandard N-gram counts, Kneser-Ney smoothing is inappropriate or inconvenient for some types of applications, including coarse-to-fine speech recognition and machine translation applications that search using a sequence of lower order to higher-order language models. In general, this is because the lower-order models used in Kneser-Ney smoothing are primarily directed towards estimating unobserved N-grams, and thus the lower-order models provide very poor estimates of the probabilities for N-grams that actually have been observed in the training corpus. Further, the nonstandard N-gram counts of Kneser-Ney smoothing are unable to be efficiently computed with language models trained on very large corpora (e.g., on the order of forty billion words), such as when processing such a large amount of data depends on using a "backsorted trie" data structure.

In sum, Kneser-Ney smoothing provides very high-quality statistical language models. However, Kneser-Ney smoothing is not appropriate for use in certain applications. What is desirable is a smoothing technology for tokens (words, characters, symbols and so forth) that can be readily used with such applications, as well as other applications, while at the same time providing generally similar high-quality results.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards a smoothing technology by which a probability is estimated for a token in a sequence of tokens based upon a number of zero or more times (actual counts) that the sequence was observed in training data. The probability may be estimated for a token in a sequence of n tokens based upon a first estimate of the probability derived from the number of times the token was observed in training data following a sequence of the previous n−1 tokens, and based upon a second estimate of the probability of the token derived from the number of times the token was observed in training data following a sequence of the previous n−2 tokens.

In one aspect, a discount parameter is set independently of interpolation parameters. If the sequence was observed at least once, a discount probability is computed based upon the discount parameter and the n−1 context, and an interpolation probability is computed based upon an interpolation parameter and the n−2 context. The discount probability is mathematically combined (e.g., summed) with the interpolation probability. If the sequence was not observed at least once, the probability is estimated by computing a backoff probability.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Various aspects of the technology described herein are generally directed towards estimating the probability of a token (word, character, symbol or the like) based upon the context of the previous n−1 tokens in a sequence of tokens. A training corpus is processed to obtain standard counts and then provide an N-gram model, which is smoothed, and accessed to determine the estimate. However, unlike prior smoothing technologies, discount and interpolation parameters are independently set as described below, which provides a high-quality N-gram model that uses standard counts in lower-order models as well as the highest order model. The technology may be used in statistical language models.

While words in a language model/training corpus are used as examples of the N-grams herein, it is understood that a token may be any grouping of one or more pieces of data, and that any of the examples described herein are non-limiting examples. As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used in various ways that provide benefits and advantages in computing and N-gram smoothing in general.

Figure 1:
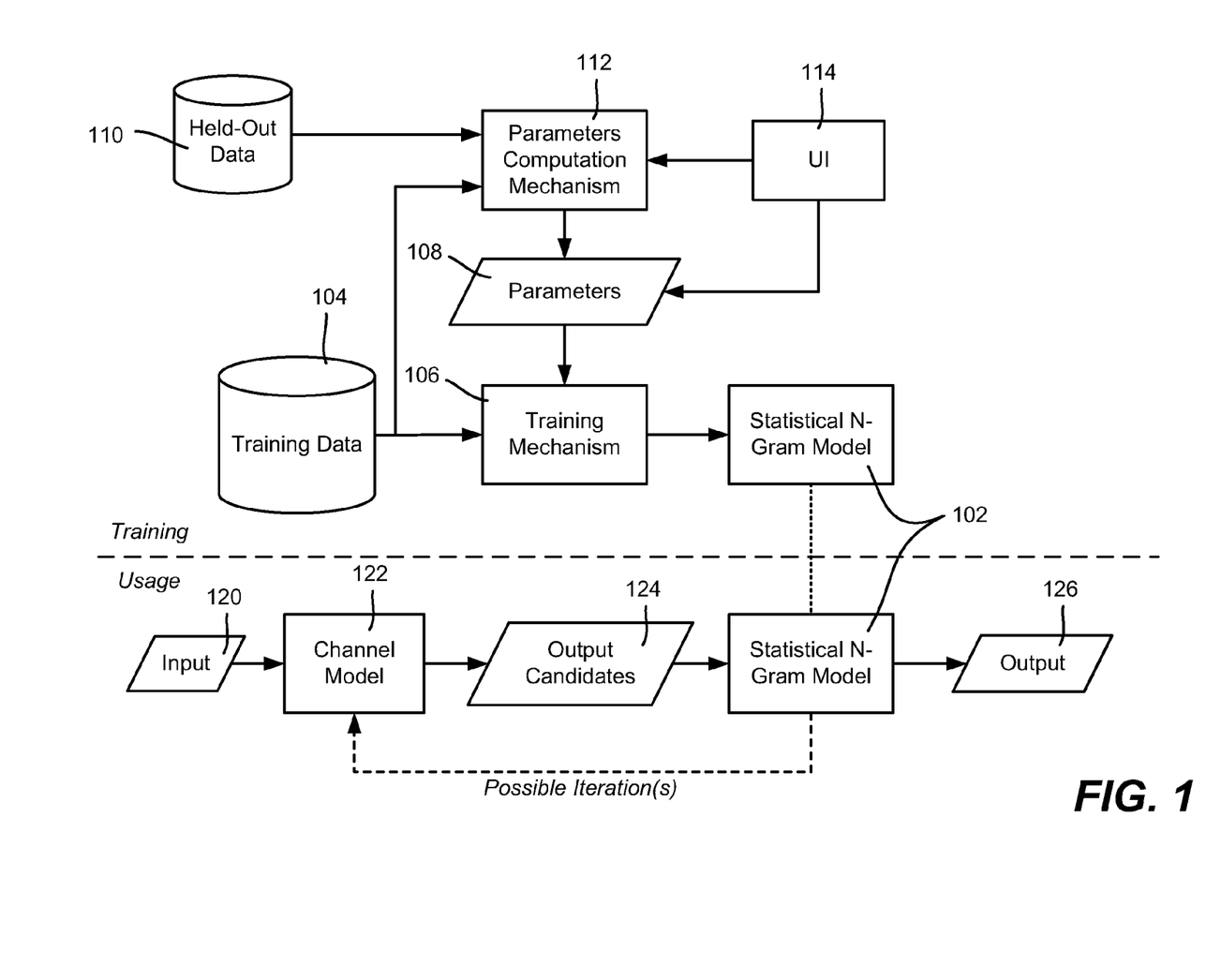
FIG. 1 is a block diagram showing example components for training and then using a statistical N-gram model based on independently controllable parameters.

FIG. 1 shows various aspects related to training and using a statistical N-gram model 102 according to the technology described herein. In general, training data 104 (e.g., a large corpus of training data such as a collection of texts in a specific natural language such as English) is processed by a training mechanism 106 to obtain the statistical N-gram model 102, such as a statistical language model. The size of the N in the N-gram model may be any number of N tokens, subject only to practical limitations.

The training mechanism 106 performs n-gram based training in a generally known manner, based on standard counts; however as described below, by independently controlling certain parameters 108 that have heretofore been linked or not used at all in training other smoothing models, higher quality results are obtainable than with other standard count smoothing methods. To this end a general smoothing schema is described that not only uses controllable discount parameters to smooth overestimated probabilities for observed N-grams, but also uses controllable interpolation parameters that can be set independently of the discount parameters to correct for another type of error, referred to as a quantization error. As described below, various mechanisms for setting the parameters 108 may be used, including processing them via a computation mechanism 112 based on other data such as held-out data 110, and/or manually setting them via a suitable user interface or the like 114.

In general, optimizing parameter values 108 on the held out data 110 tries different combinations of values for the parameters being optimized; for each combination of values, a model is built from the training data 104, and tested on the held out data 110. The combination of parameter values that performs the best on the held out data 110 is selected. A suitable test measures the probability (equivalently, the perplexity) of the held out data according to the corresponding model, with the selected parameters being the set of values that gives the highest probability for the held out data.

For completeness, FIG. 1 also shows the statistical N-gram model in an example usage scenario, such as in use as a statistical language model. Given some input 120, a channel model 122 such as a speech recognition system or machine translation system provides output candidates 124 to the trained statistical N-gram model 102. The statistical N-gram model 102 returns probabilities for these output candidates 124. These may be used to compute the output 126, which may be used directly or in an iterative manner, e.g., in a coarse-to-fine configuration.

The following shows such a general n-gram model smoothing schema:

$$p(w_n | w_1 \ldots w_{n-1}) = \begin{cases} \alpha_{w_1 \ldots w_{n-1}} \frac{C_n(w_1 \ldots w_n) - D_{n,C_n(w_1 \ldots w_n)}}{\sum_{w'} C_n(w_1 \ldots w_{n-1} w')} + \\ \quad \beta_{w_1 \ldots w_{n-1}} p(w_n | w_2 \ldots w_{n-1}) \\ \gamma_{w_1 \ldots w_{n-1}} p(w_n | w_2 \ldots w_{n-1}) \end{cases} \begin{matrix} \text{if } C_n(w_1 \ldots w_n) > 0 \\ \\ \text{if } C_n(w_1 \ldots w_n) = 0 \end{matrix}$$

where p represents the probability value computed for that token, such as a word $w_n$, given the preceding context $w_1 \ldots w_{n-1}$, $D_{n,C_n}(w_1 \ldots w_n)$ is the discount parameter, and $\alpha$ and $\beta$ are interpolation parameters for the context $w_1 \ldots w_{n-1}$. $C_n(w_1 \ldots w_n)$ represents the count of the n-gram $w_1 \ldots w_n$, which is greater than zero for observed n-grams, i.e., $C_n(w_1 \ldots w_n) > 0$, or is zero for unobserved n-grams, i.e., $C_n(w_1 \ldots w_n) = 0$. The $\gamma$ parameter is the backoff parameter for the context $w_1 \ldots w_{n-1}$, and is based upon the values of the other parameters, being set to whatever value is necessary to make the conditional probabilities for the context $w_1 \ldots w_{n-1}$ sum to 1.

The language model smoothing methods described herein are based on the above recursive schema for all n greater than two, where N is the greatest N-gram length used in the model; (for n equal to two, the expression $p(w_n | w_2 \ldots w_{n-1})$ denotes the unigram probability estimate $p(w_2)$). In this schema, $C_n$ denotes the counting method used for N-grams of length n. For most smoothing methods, $C_n$ denotes actual training corpus counts for all n; (note that for Kneser-Ney smoothing and its variants, however, $C_n$ denotes actual corpus counts only when n is the greatest N-gram length used in the model, and otherwise denotes the non-standard Kneser-Ney diversity counts).

In this schema, each N-gram count is discounted according to a D parameter that depends, at most, on the N-gram length and the N-gram count itself. The values of the $\alpha$, $\beta$, and $\gamma$ parameters depend on the context $w_1 \ldots w_{n-1}$. For each context, the values of $\alpha$, $\beta$, and $\gamma$ are set to produce a normalized conditional probability distribution.

In other known models in which the D parameters are used (i.e., D>0), there are constraints such that ultimately the values of the $\alpha$, $\beta$, and $\gamma$ parameters are fixed by the values selected for the D (discount-related) parameters. By way of example, existing classes of smoothing methods include pure backoff methods, in which all instances of $\alpha=1$ and all instances of $\beta=0$. One backoff method, known as Katz backoff, evaluates whether $C(w_1 \ldots w_n)$ is greater than a threshold (e.g., 5, as recommended by Katz). If so, the corresponding D=0, otherwise D is set according to the well-known Good-Turing method. As another example referred to as backoff absolute discounting, the D parameters depends at most on n; there is either one discount per N-gram length, or a single discount used for all N-gram lengths. The values of D can be set either by empirical optimization on held-out data, or based on a theoretically optimal value derived from a leaving-one-out analysis.

Another class of smoothing methods are pure interpolation methods, in which for each context, $\beta$, and $\gamma$ are constrained to be equal. Such models include interpolated absolute discounting, interpolated Kneser-Ney, and modified interpolated Kneser-Ney. In these three methods, all instances of $\alpha=1$. Another pure interpolation instance, referred to as Jelinek-Mercer smoothing, has all instances of D=0 and, for each context, $\alpha+\beta=1$.

Note that unsmoothed MLE language models mainly suffer from two sources of error in estimating probabilities for the N-grams observed in the training corpus. One error is overestimation error, which most smoothing methods are directed towards overcoming. This error arises from the fact that, on the whole, the MLE probabilities for the observed N-grams are overestimated, because they end up with all the probability mass instead of assigning some to the unobserved N-grams.

Another source of error in MLE models is quantization error, which results from the fact that in MLE models only certain estimated probability values are possible for a given context, depending on the number of occurrences of the context in the training corpus. By way of example, if there are ten occurrences of a context, then the MLE probability values for the context are quantized in 0.1 increments; however such quantization causes imprecise estimates. In general, the quantization error is expected be roughly proportional to the number of distinct N-gram counts for a given context.

No pure backoff model addresses this source of error, because no matter how the discount parameters are set, the number of possible probability values for a given context cannot be increased just by discounting observed counts, as long as all N-grams with the same count receive the same discount. Interpolation models address quantization error by interpolation with lower-order estimates, which ordinarily have lower quantization error, due to higher context counts. However, most interpolation models are constrained so that the discount parameters fully determine the interpolation parameters. As a result, the discount parameters need to correct for both types of errors.

The technology described herein is directed towards a model that reduces such constraints to provide additional degrees of freedom, in that the $\alpha$ and $\beta$ interpolation parameters are able to be set completely independently of the discount parameters $D$, with the intention that the $\alpha$ and $\beta$ interpolation parameters correct for quantization error, and the $D$ parameters correct for overestimation error. This is accomplished by relaxing the link between the $\beta$ and $\gamma$ parameters.

More particularly, for each context, the only constraints are that $\alpha \geq 0$, $\beta \geq 0$, and $\alpha+\beta=1$, and that for every $D$ parameter, $0 \leq D \leq 1$. For each context, for whatever values are chosen for these parameters within these constraints, some probability mass between 0 and 1 will be left over to be distributed across the unobserved N-grams by a value of $\gamma$ that normalizes the conditional distribution.

The above general schema may be used as a basis for the following, in which $p_D$ represents the discounted probability, $p_I$ represents the interpolated probability, and $p_{BO}$ represents the backoff probability:

$$p(w_n \mid w_1 \ldots w_{n-1}) =$$

$$\begin{cases} p_D(w_n \mid w_1 \ldots w_{n-1}) + p_I(w_n \mid w_1 \ldots w_{n-1}) & \text{if } C_n(w_1 \ldots w_n) > 0 \\ p_{BO}(w_n \mid w_1 \ldots w_{n-1}) & \text{if } C_n(w_1 \ldots w_n) = 0 \end{cases}$$

$$p_D(w_n \mid w_1 \ldots w_{n-1}) = \alpha_{w_1 \ldots w_{n-1}} \frac{C_n(w_1 \ldots w_n) - D_{n,C_n(w_1 \ldots w_n)}}{\sum_{w'} C_n(w_1 \ldots w_{n-1} w')}$$

$$p_I(w_n \mid w_1 \ldots w_{n-1}) = \beta_{w_1 \ldots w_{n-1}} p(w_n \mid w_2 \ldots w_{n-1})$$

$$p_{BO}(w_n \mid w_1 \ldots w_{n-1}) = \gamma_{w_1 \ldots w_{n-1}} p(w_n \mid w_2 \ldots w_{n-1})$$

As can be seen, the weights $\alpha$, $\beta$, and $\gamma$ all depend on the context; that is, for each $w_1 \ldots w_{n-1}$ there may be a different values for $\alpha$, $\beta$, and $\gamma$. For the discounted probability, the $\alpha$ weight is multiplied by the observed count, with a discount subtracted, and divided by the sum of all the observed counts for that context.

For the interpolated probability, the weight $\beta$ is multiplied by the estimated probability given one less word of context, that is, $w_2 \ldots w_{n-1}$. For the backoff probability, similarly the weight $\gamma$ is multiplied by the estimated probability given one less word of context.

Note that this is in contrast to pure backoff methods, in which $\alpha=1$ and $\beta=0$. This is also in contrast to pure interpolation methods, in which $\beta$ and $\gamma$ are the same and are determined by the $D$ parameters.

As described above, in one implementation, the only constraints are that, for each context, $\alpha \geq 0$, $\beta \geq 0$, and $\alpha+\beta=1$, and that for every N-gram, the discount is between zero and one, that is, $0 \leq D \leq 1$. By obeying these constraints, $D$ may be set independently of $\alpha$ and $\beta$, while leaving some probability mass between zero and one for $\gamma$.

To set the $\alpha$ and $\beta$ parameters, assume that there is a single unknown probability distribution for the amount of quantization error in every N-gram count. If so, the total quantization error for a given context will tend to be proportional to the number of distinct counts for that context, in other words, the number of distinct word types occurring in that context. $\alpha$ and $\beta$ are then set to replace the proportion of the total probability mass for the context represented by the estimated quantization error, with probability estimates derived from the lower-order models:

$$\beta_{w_1 \ldots w_{n-1}} = \delta \frac{|\{w' \mid C_n(w_1 \ldots w_{n-1} w') > 0\}|}{\sum_{w'} C_n(w_1 \ldots w_{n-1} w')}$$

$$\alpha_{w_1 \ldots w_{n-1}} = 1 - \beta_{w_1 \ldots w_{n-1}}$$

where $\delta$ is the estimated mean of the quantization errors introduced by each N-gram count. A single value of $\delta$ may be used for all contexts and all N-gram lengths. As one estimate, assume that, since the distance between possible N-gram counts, after discounting, is approximately 1.0, their mean quantization error would be approximately 0.5. Another way to set $\delta$ is by optimization on held-out data.

A number of techniques may be used to set the discount parameters in this independent discount/interpolation parameters model. For example, one technique is to use a single theory-based discount for each N-gram length. The discount computation is based upon the known Ney et al. absolute discount formula. In this formula, the values of $D$ can be set based on a theoretically optimal value derived from a leaving-one-out analysis, which Ney et al. have shown to be approximated for each N-gram length by $N_1/(N_1+2N_2)$, where $N_r$ is the number of distinct N-grams of that length occurring $r$ times in the training Corpus.

Another technique is to use a single discount for all N-gram lengths. The single discount may be found by empirically optimizing on held-out data.

Another technique for setting the discount is to choose three theory-based discounts for each N-gram length. Instead of one $D$ parameter for each N-gram length, there are three $D$ parameters, namely $D_1$ for N-grams whose count is one, $D_2$ for N-grams whose count is two, and $D_3$ for N-grams whose count is three or more. The values of these parameters may be set by empirical optimization on held-out data, for example, or by a theoretically-derived formula analogous to the Ney et al. formula for the one-discount case:

$$D_r = r - (r+1)Y\frac{N_{r+1}}{N_r}$$

for $1 \leq r \leq 3$, where $Y = N_1/(N_1 + 2N_2)$, the discount value derived by Ney et al.

Another technique uses a set of three theory-based discounts for each N-gram length, based on Good-Turing discounting. This may be represented by the formula:

$$D_r = r - (r+1)\frac{N_{r+1}}{N_r}$$

which is the same as the first three-theory-based technique discounts formula, except that the Y factor is omitted; since Y is generally between 0 and 1, the resulting discounts are smaller.

Figure 2:
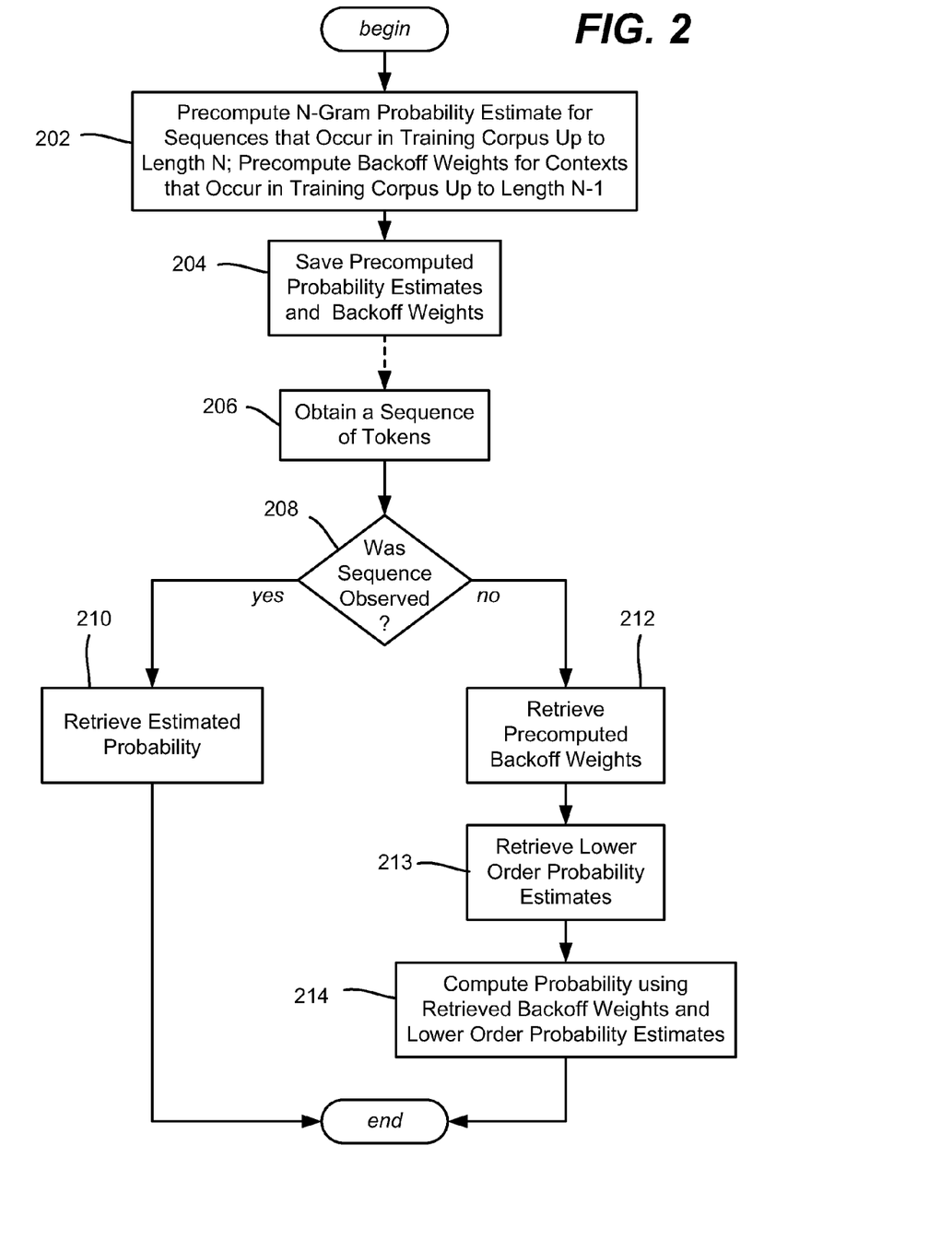
FIG. 2 is a flow diagram showing example steps for determining a probability for a token given a sequence of tokens, using actual counts.

FIG. 2 summarizes how the probability of a token following a sequence of tokens is determined. In one implementation, step 202 precomputes the N-gram probability estimate for the sequences that occur in the training corpus up to length N, and simultaneously precomputes the backoff weights for the contexts that occur in the training corpus up to length N−1. Step 204 saves these estimates and weights, e.g., in a suitable data structure such as a table.

At the time the model is applied to a sequence of tokens/N-gram obtained at step 206, (which may be any time after steps 202 and 204 as represented by the dashed arrow to step 206), a decision is made at step 208 based upon whether the sequence was observed or not. As a consequence of steps 202 and 204, this may be determined simply by checking whether a precomputed probability estimate for the N-gram has been saved. For an observed N-gram sequence, the estimated probability is retrieved from the saved table of precomputed values as represented by step 210. For sequences/N-grams that have not been observed in the training data, the probabilities are computed dynamically, using the precomputed backoff weights and lower order probability estimates, as represented by steps 212-214.

Exemplary Operating Environment

Figure 3:
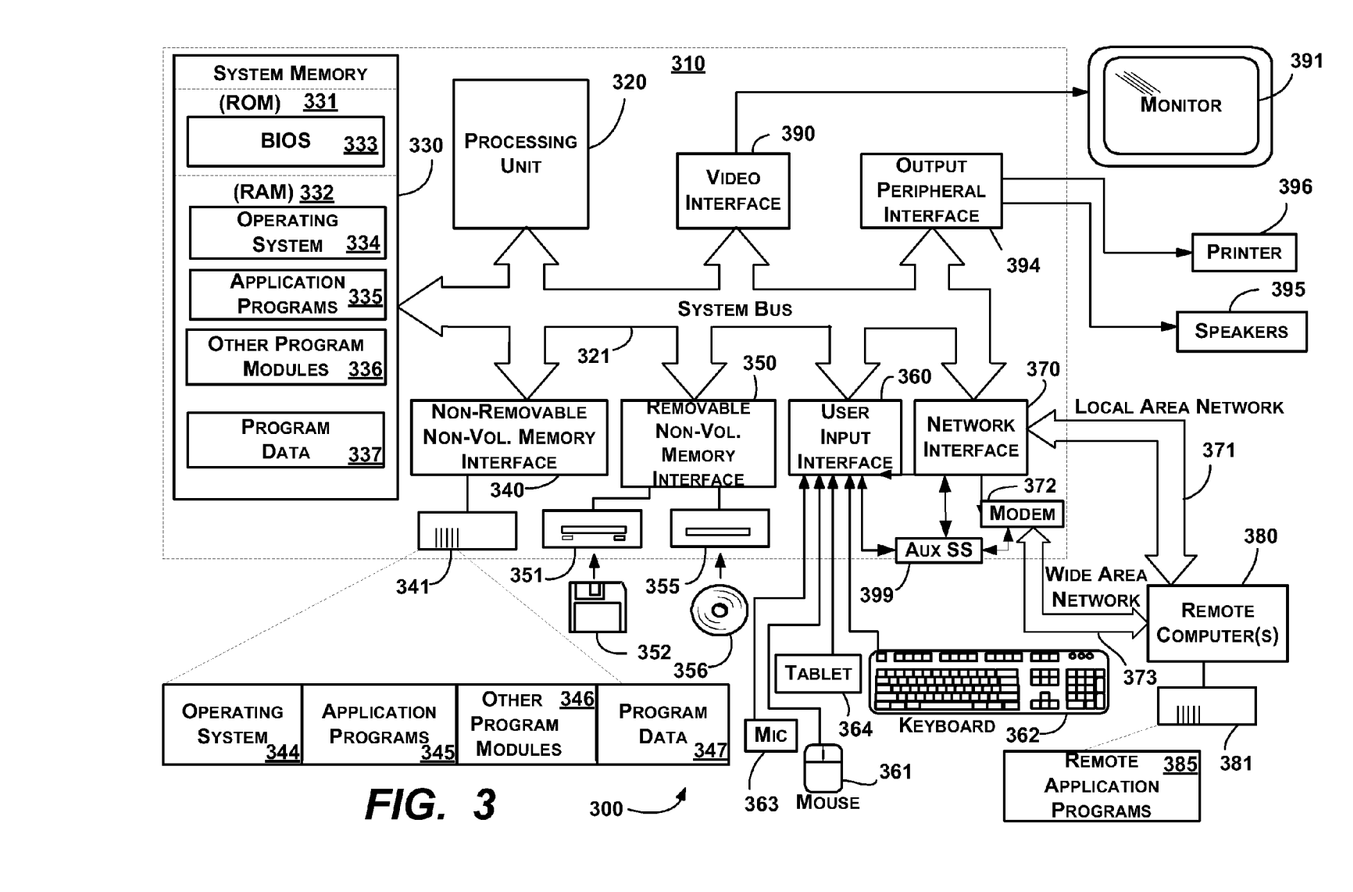
FIG. 3 shows an illustrative example of a computing environment into which various aspects of the present invention may be incorporated.

FIG. 3 illustrates an example of a suitable computing and networking environment 300 on which the examples of FIGS. 1 and 2 may be implemented. The computing system environment 300 is only one example of a suitable computing environment and is not intended to suggest any limitation as to the scope of use or functionality of the invention. Neither should the computing environment 300 be interpreted as having any dependency or requirement relating to any one or combination of components illustrated in the exemplary operating environment 300.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 3, an exemplary system for implementing various aspects of the invention may include a general purpose computing device in the form of a computer 310. Components of the computer 310 may include, but are not limited to, a processing unit 320, a system memory 330, and a system bus 321 that couples various system components including the system memory to the processing unit 320. The system bus 321 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 310 typically includes a variety of computer-readable media. Computer-readable media can be any available media that can be accessed by the computer 310 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 310. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above may also be included within the scope of computer-readable media.

The system memory 330 includes computer storage media in the form of volatile and/or nonvolatile memory such as read only memory (ROM) 331 and random access memory (RAM) 332. A basic input/output system 333 (BIOS), containing the basic routines that help to transfer information between elements within computer 310, such as during start-up, is typically stored in ROM 331. RAM 332 typically contains data and/or program modules that are immediately accessible to and/or presently being operated on by processing unit 320. By way of example, and not limitation, FIG. 3 illustrates operating system 334, application programs 335, other program modules 336 and program data 337.

The computer 310 may also include other removable/non-removable, volatile/nonvolatile computer storage media. By way of example only, FIG. 3 illustrates a hard disk drive 341 that reads from or writes to non-removable, nonvolatile magnetic media, a magnetic disk drive 351 that reads from or writes to a removable, nonvolatile magnetic disk 352, and an optical disk drive 355 that reads from or writes to a removable, nonvolatile optical disk 356 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 341 is typically connected to the system bus 321 through a non-removable memory interface such as interface 340, and magnetic disk drive 351 and optical disk drive 355 are typically connected to the system bus 321 by a removable memory interface, such as interface 350.

The drives and their associated computer storage media, described above and illustrated in FIG. 3, provide storage of computer-readable instructions, data structures, program modules and other data for the computer 310. In FIG. 3, for example, hard disk drive 341 is illustrated as storing operating system 344, application programs 345, other program modules 346 and program data 347. Note that these components can either be the same as or different from operating system 334, application programs 335, other program modules 336, and program data 337. Operating system 344, application programs 345, other program modules 346, and program data 347 are given different numbers herein to illustrate that, at a minimum, they are different copies. A user may enter commands and information into the computer 310 through input devices such as a tablet, or electronic digitizer, 364, a microphone 363, a keyboard 362 and pointing device 361, commonly referred to as mouse, trackball or touch pad. Other input devices not shown in FIG. 3 may include a joystick, game pad, satellite dish, scanner, or the like. These and other input devices are often connected to the processing unit 320 through a user input interface 360 that is coupled to the system bus, but may be connected by other interface and bus structures, such as a parallel port, game port or a universal serial bus (USB). A monitor 391 or other type of display device is also connected to the system bus 321 via an interface, such as a video interface 390. The monitor 391 may also be integrated with a touch-screen panel or the like. Note that the monitor and/or touch screen panel can be physically coupled to a housing in which the computing device 310 is incorporated, such as in a tablet-type personal computer. In addition, computers such as the computing device 310 may also include other peripheral output devices such as speakers 395 and printer 396, which may be connected through an output peripheral interface 394 or the like.

The computer 310 may operate in a networked environment using logical connections to one or more remote computers, such as a remote computer 380. The remote computer 380 may be a personal computer, a server, a router, a network PC, a peer device or other common network node, and typically includes many or all of the elements described above relative to the computer 310, although only a memory storage device 381 has been illustrated in FIG. 3. The logical connections depicted in FIG. 3 include one or more local area networks (LAN) 371 and one or more wide area networks (WAN) 373, but may also include other networks. Such networking environments are commonplace in offices, enterprise-wide computer networks, intranets and the Internet.

When used in a LAN networking environment, the computer 310 is connected to the LAN 371 through a network interface or adapter 370. When used in a WAN networking environment, the computer 310 typically includes a modem 372 or other means for establishing communications over the WAN 373, such as the Internet. The modem 372, which may be internal or external, may be connected to the system bus 321 via the user input interface 360 or other appropriate mechanism. A wireless networking component such as comprising an interface and antenna may be coupled through a suitable device such as an access point or peer computer to a WAN or LAN. In a networked environment, program modules depicted relative to the computer 310, or portions thereof, may be stored in the remote memory storage device. By way of example, and not limitation, FIG. 3 illustrates remote application programs 385 as residing on memory device 381. It may be appreciated that the network connections shown are exemplary and other means of establishing a communications link between the computers may be used.

An auxiliary subsystem 399 (e.g., for auxiliary display of content) may be connected via the user interface 360 to allow data such as program content, system status and event notifications to be provided to the user, even if the main portions of the computer system are in a low power state. The auxiliary subsystem 399 may be connected to the modem 372 and/or network interface 370 to allow communication between these systems while the main processing unit 320 is in a low power state.

CONCLUSION

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. In a machine translation system or a speech recognition system, a method performed on at least one processor, comprising, processing an output candidate comprising a sequence of tokens for natural language input, including estimating an estimated probability for a token in the sequence of tokens based upon actual counts corresponding to a number of zero or more times that the sequence was observed in training data, including controlling interpolation parameters independently from controlling a discount parameter, and when the sequence was observed at least once, computing a discount probability based upon the discount parameter subtracted from a maximum likelihood probability estimate that is based upon a context corresponding to the sequence, computing an interpolation probability based upon one interpolation parameter and a smaller other context corresponding to the sequence, mathematically combining the discount probability with the interpolation probability to provide the estimated probability, and using the estimated probability to generate an alternative output for at least a portion of the natural language input.

2. The method of claim 1 wherein when the sequence was not observed at least once, estimating the estimated probability comprises computing a backoff probability based upon a normalization parameter, and using the backoff probability as the estimated probability.

3. The method of claim 1 wherein the interpolation parameters have values that sum to one.

4. The method of claim 1 wherein setting the interpolation parameters comprises estimating an estimated mean for quantization errors based upon a sequence count, and using the estimated mean to compute at least one of the interpolation parameters.

5. The method of claim 4 wherein estimating the mean comprises optimizing based upon testing a plurality of possible values.

6. The method of claim 1 wherein the setting the discount parameter comprises determining a discount value for each sequence length.

7. The method of claim 1 wherein the setting the discount parameter comprises optimizing a single discount value based upon testing a plurality of possible discount values, and using the single discount value for all sequence lengths.

8. The method of claim 1 wherein the setting the discount parameter comprises using a first discount value if the sequence is of length one, using a second discount value if the sequence is of length two, and using a third discount value if the sequence is greater than length two.

9. The method of claim 8 wherein each discount value is based in part upon a factor corresponding to a theoretically optimal discount value.

10. The method of claim 8 wherein the sequence comprise words, and further comprising, using the estimated probability in a statistical language model.

11. One or more computer-readable storage devices having computer-executable instructions, which when executed perform steps, comprising, performing machine translation or speech recognition on natural language input by estimating a probability for a token in a natural language sequence of n tokens based upon a number of times the token was observed in training data following a natural language sequence of n−1 tokens using actual counts, including, when the number of times is greater than zero, computing the probability based upon count data, a discount parameter and interpolation weights in which the interpolation weights are not determined from the discount parameter and are computed based upon a smaller context than the natural language sequence of n−1 tokens, correcting the estimated probability for the token representing at least one output candidate for the natural language input by mathematically combining the discount probability with the interpolation probability to provide the estimated probability, and when the number of times is zero, computing the probability based upon a backoff weight.

12. The one or more computer-readable storage devices of claim 11 wherein the interpolation weights include an alpha weight multiplied by the count data, and a beta weight multiplied by a probability of the token based upon a sequence of the previous n−2 tokens, in which the beta weight is greater than zero and is not equal to the backoff weight.

13. The one or more computer-readable storage devices of claim 11 wherein the interpolation weights include an alpha weight multiplied by the count data, and a beta weight multiplied by a probability of the token based upon a sequence of the previous n−2 tokens, in which the alpha and beta weights sum to one and the discount parameter is greater than zero.

14. The one or more computer-readable storage devices of claim 11 having further computer-executable instruction comprising, outputting natural language text based upon estimated probabilities of the natural language sequence of n tokens.

15. The one or more computer-readable storage devices of claim 14 having further computer-executable instruction comprising, outputting natural language text based upon estimated probabilities of the natural language sequence of n tokens.

16. The one or more computer-readable storage devices of claim 11 having further computer-executable instruction comprising using a single discount value for all sequence lengths as the discount parameter.

17. The one or more computer-readable storage devices of claim 16 having further computer-executable instruction comprising optimizing the single discount value based upon testing a plurality of possible discount values.

18. The one or more computer-readable storage devices of claim 11 having further computer-executable instruction comprising setting the discount parameter by using a first discount value if the sequence is of length one, using a second discount value if the sequence is of length two, and using a third discount value if the sequence is greater than length two.

19. The one or more computer-readable storage devices of claim 11 having further computer-executable instruction comprising setting the discount parameter by using a first discount value if the sequence is of length one, using a second discount value if the sequence is of length two, and using a third discount value if the sequence is greater than length two, wherein each discount value is based in part upon a factor corresponding to a theoretically optimal discount value.

20. A machine translation system or a speech recognition having one or more computer-readable storage devices having computer-executable instructions, which when executed perform steps, comprising:
   precomputing n-Gram probability estimates for natural language sequences that occur in a training corpus up to length n based upon actual counts, a discount parameter and an interpolation parameter, in which the discount parameter and the interpolation parameter are independently controllable, the discount parameter and the interpolation parameter to correct for overestimation and quantization, respectively, when smoothing the n-Gram probability estimates;
   storing the probability estimates in a probability estimates data structure; precomputing backoff weights for contexts that occur in the training corpus up to length n−1 in which the backoff weights are dependent only upon the contexts;
   storing the backoff weights in a backoff weights data structure; processing an output candidate for each token in a sequence of tokes corresponding to natural language input using providing an estimated probability for the token in a sequence of tokens, including by determining whether the sequence was observed in the training data, and
      if so, providing the estimated probability from the probability estimates data structure and
      if not, retrieving one or more precomputed backoff weights from the backoff weights data structure, retrieving one or more lower order probability estimates from the probability estimates data structure, and providing the estimated probability by computing a probability using the one or more retrieved backoff weights and one or more lower order probability estimates; and
   outputting natural language text based upon the estimated probability of each token.

* * * * *